United States Patent [19]

Newman et al.

[11] Patent Number: 5,341,222
[45] Date of Patent: Aug. 23, 1994

[54] DISTRIBUTED FACSIMILE INFORMATION SYSTEM AND METHOD

[75] Inventors: Charles Newman; Paul L. Jones; Charles King, all of Ann Arbor, Mich.

[73] Assignee: Demand Publishing, Inc., Dexter, Mich.

[21] Appl. No.: 884,393

[22] Filed: May 18, 1992

[51] Int. Cl.$^5$ .................. H04M 11/08; H04N 1/42
[52] U.S. Cl. ..................... 358/403; 379/100
[58] Field of Search ............ 358/400, 401, 402, 403, 358/500, 501; 379/90, 100, 201, 57

[56] References Cited

U.S. PATENT DOCUMENTS

| | | | |
|---|---|---|---|
| Re. 34,429 | 11/1993 | Baran et al. | 358/468 X |
| 3,728,486 | 4/1973 | Kraus . | |
| 4,058,838 | 11/1977 | Crager et al. | 358/257 |
| 4,893,333 | 1/1990 | Baran et al. | 379/100 |
| 4,910,765 | 3/1990 | Matsuse et al. | 379/100 |
| 4,918,722 | 4/1990 | Duehren et al. | 379/100 |
| 4,974,254 | 11/1990 | Perine et al. | 379/100 |
| 5,068,888 | 11/1991 | Scherk et al. | 379/100 |
| 5,072,309 | 12/1991 | Brown | 358/434 |
| 5,247,571 | 9/1993 | Kay et al. | 379/207 |
| 5,260,986 | 11/1993 | Pershan | 379/57 |
| 5,265,033 | 11/1993 | Vajk et al. | 364/514 |

OTHER PUBLICATIONS

Xerox Brochure for "PaperWorks".

Primary Examiner—Bentsu Ro
Attorney, Agent, or Firm—Krass & Young

[57] ABSTRACT

A distributed facsimile information system for providing information subscribers with documents and other requested information. The system includes a central processing unit in communication with a central data base and a number of satellite data bases at remote locations. The central data base includes a plurality of data files containing digitally stored documents and other information, and each of the satellite data bases includes some of the data files contained in the central data base. A terminal including a touch-tone phone and a facsimile machine is situated at the location of each information subscriber. A request for information is made via the touch-tone phone, and the system prompts a user through a series of menus for input of information identifying the particular document requested. The central processing unit then determines which of the data bases contains the document and is closest to the requestor's terminal for transmission of the document.

16 Claims, 2 Drawing Sheets

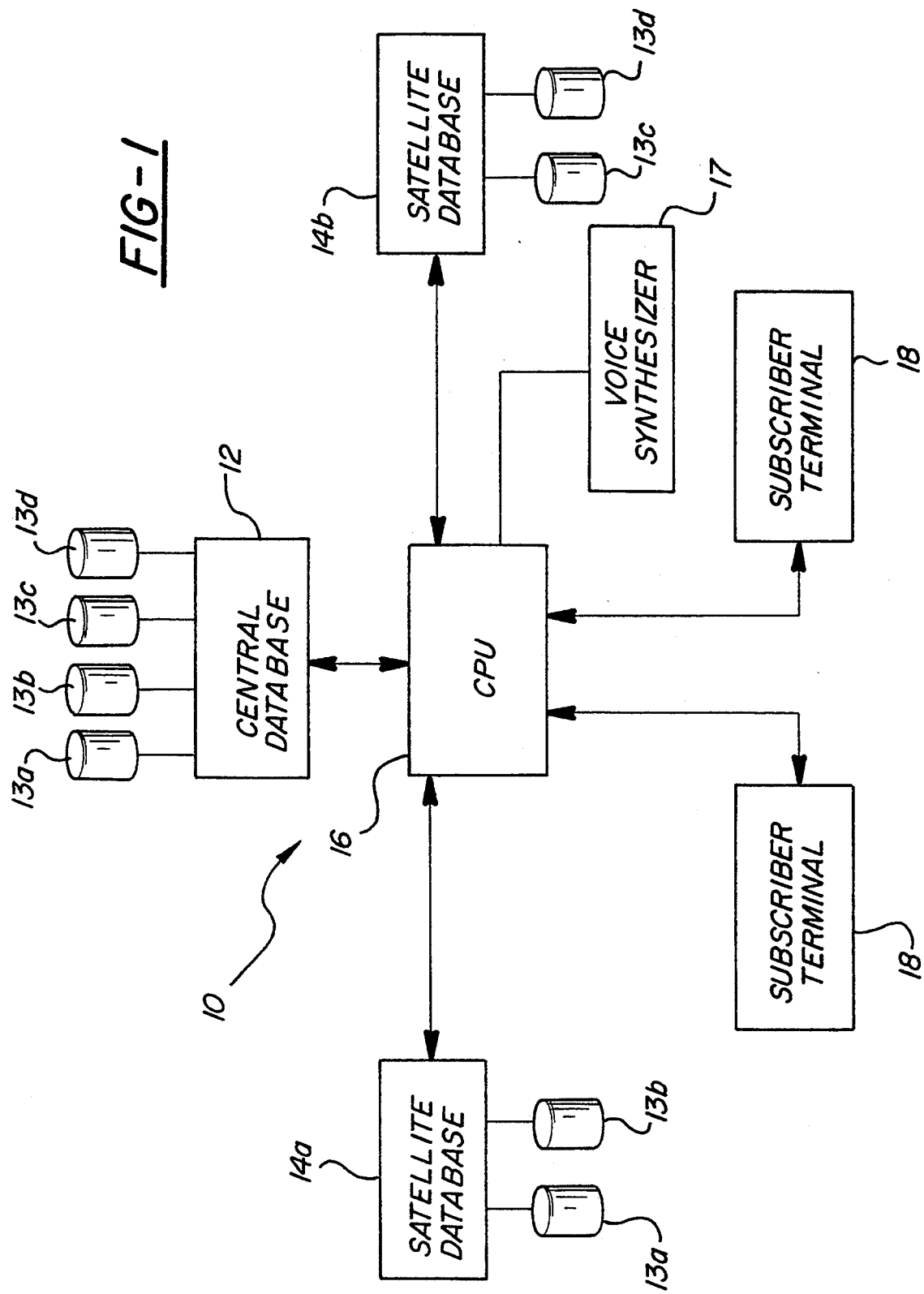

DISTRIBUTED FACSIMILE INFORMATION SYSTEM AND METHOD

FIELD OF THE INVENTION

The present invention relates generally to facsimile information distribution systems and methods and, more particularly, to such a system and method including a central data base and satellite data bases for efficient delivery of requested information to a subscriber terminal.

BACKGROUND OF THE INVENTION

Various systems have been developed for automated transmission of documents or other information over the public telephone lines to the facsimile machine of an information requestor. For examples of such systems, see U.S. Pat. Nos. 4,910,765; 4,893,333; 4,918,722; 4,864,254; 5,068,888; and 5,072,309. By using a facsimile-based information service, a user can virtually instantaneously obtain a hard copy of a document from, for example, a library or other central information source, thus avoiding the delays attendant with mail services or the expenses involved in personal delivery.

Because of the time advantages inherent in facsimile transmission of information, it has become virtually a standard of doing business. However, there are a number of problems associated with delivering requested information or documents from a central information source which must be overcome for such schemes to become practical and widespread. For example, the person requesting the information must be identified in some fashion. Obviously, this can be done by verbal communication over the phone, or assigning each user an identification number which is inputted via touch tone phone. However, this requires each user to keep track of the identification number, and makes routing of information to anyone else difficult.

Another problem associated with facsimile retrieval of information from a central data source is the expense of conducting such exchange via the public telephone network. If the central data base, for example, is in Washington, D.C. and the requestor is in California, the long distance charges for transmission of a document of any size can be prohibitively expensive.

Another complication that must be dealt with by any efficient system is the necessity for billing charges incurred by the user. Of course, any facsimile information system must include means for identifying the information requestor (a telephone number, tax number, an established account number, et cetera) but, again, accounting personnel will be needed to correlate the charges for a particular facsimile transmission with the requestor, establish a charge for the service, and bill it to the customer. Again, this increases the total cost and inefficiency of the system.

Clearly, it would be desirable to provide a facsimile information system and method which automatically routes information to the correct individual, minimize the cost of long distance telephone service, and automatically calculate a charge and bill it to the customer without the necessity of human intervention.

SUMMARY OF THE INVENTION

Described and claimed herein is a distributed facsimile information system and method. The system includes a number of data bases, including a central data base and at least one, and preferably a number of, satellite data bases at locations remote from the central data base. The central data base includes a plurality of data files containing digitally stored information. For example, a data file may digitally store the contents of a standard reference encyclopedia. Another data file may contain digitally stored information representing all U.S. patents issued after, for example, 1980. Another data file may include subfiles, each containing the laws and statutes of a particular state of the Union. Obviously, these are but a few examples of the almost endless amount of information digitally storable in a data file which is of interest to enough possible subscribers to be commercially valuable.

In the present scheme, the central data base typically contains all of the data files included in the system. Thus, it may have all of the above-mentioned data files, as well as numerous others. However, each satellite data base has somewhat fewer data files than the central data base. For example, a satellite data base in Salt Lake City may include sub files for the laws and statutes for only the Western states, and another one in Chicago may include files for the Midwestern states, et cetera. Furthermore, a data base that has proven to be particularly popular with subscribers, such as a standard reference encyclopedia, may be duplicated in all the satellite date bases. More esoteric data files such as the contents of obscure academic journals, which are not commonly requested by many subscribers, may be located at the central data base.

The system further includes a central processing unit in communication with all of the data bases. Preferably, the central processing unit will be located in close proximity to the central data base for ease administration. A plurality of input/output terminals are situated at remote locations of information subscribers. Each input/output terminal includes a touch-tone telephone and a facsimile machine capable of sending and receiving facsimile transmissions. Both of these items are standard equipment, which connect with the switched network of the public telephone system, and no particular design or configuration is needed for practicing the present invention.

Each subscriber to the information system has at least one terminal. The buttons of the touch-tone phone may be used to enter inputs corresponding to a request for particular information, and the facsimile machine for the receipt of the requested information. Of course, both devices may be used interactively under the present system as will be explained below.

In one embodiment of the system of the present invention, the touch-tone phone allows the information requestor to communicate interactively with a voice synthesis program which prompts the user through a series of commands. Thus, the voice synthesis program may prompt a new subscriber through a series of menus which allow the system to assign the new subscriber an account number in a completely automated manner. After the account number is automatically set up, a confirming facsimile is transmitted to the new subscriber so that he/she will have a hard copy of the subscriber information, including the account number.

In another preferred embodiment, means are provided for routing requested information to a particular individual who is a member of a group subscriber. That is, the information subscriber may be a business or institution, and a number of members of the group entity may routinely request information or documents via the system. It would, of course, be possible to provide each potential user with an individual identification number, but such a scheme would be cumbersome, complicated, and suffer the disadvantage that each individual must remember his/her own number. Also, a facsimile based information system might use an optical reader (OCR) to scan information handwritten by the requestor and transmitted via facsimile to the central system. However, OCRs capable of accurately deciphering handwriting are notoriously expensive and unreliable. The present system takes advantage of the graphic capability of facsimile transmission to solve this problem. After an information requestor has logged into the system via the touch-tone telephone and provided the account number, the system is programmed to transmit a fax containing a block for entry of the individual's name, location, department number, et cetera. The individual is instructed to fill this information into the block provided, and simply transmit the completed form back to the information service. After the system has retrieved the information and documents requested by the individual, the completed form is simply retransmitted back to the subscriber for distribution, along with the documents, to the identified individual. Alternatively, the system will simply store the graphic appearance of the billed out blank in digital form and retransmit the blank back to the requestor as part of the retrieved information.

The central processing unit of the present invention is programmed to perform a number of tasks, including those described above. In addition, the CPU, in response to the information request from the user, will scan all the data bases to determine those which have the data file containing the requested information, and select that data base which is closest to the location of the information requestor so that transmission charges are minimized.

In addition, the CPU is programmed to calculate a charge to the subscriber for providing the requested information and generate digital information relating to an invoice reflecting this charge. The digital information so generated will then be transmitted to the requestor as a printed invoice and as an integral part of the request for information. This capability eliminates the necessity of separate billing.

BRIEF DESCRIPTION OF THE DRAWINGS

Throughout the following detailed description, the various described elements of the present invention may best be understood by reference to the following drawing in which:

FIG. 1 is a block diagram of one embodiment of the distributed facsimile information system of the present invention;

DETAILED DESCRIPTION OF THE PREFERRED EMBODIMENT

Figure 3:
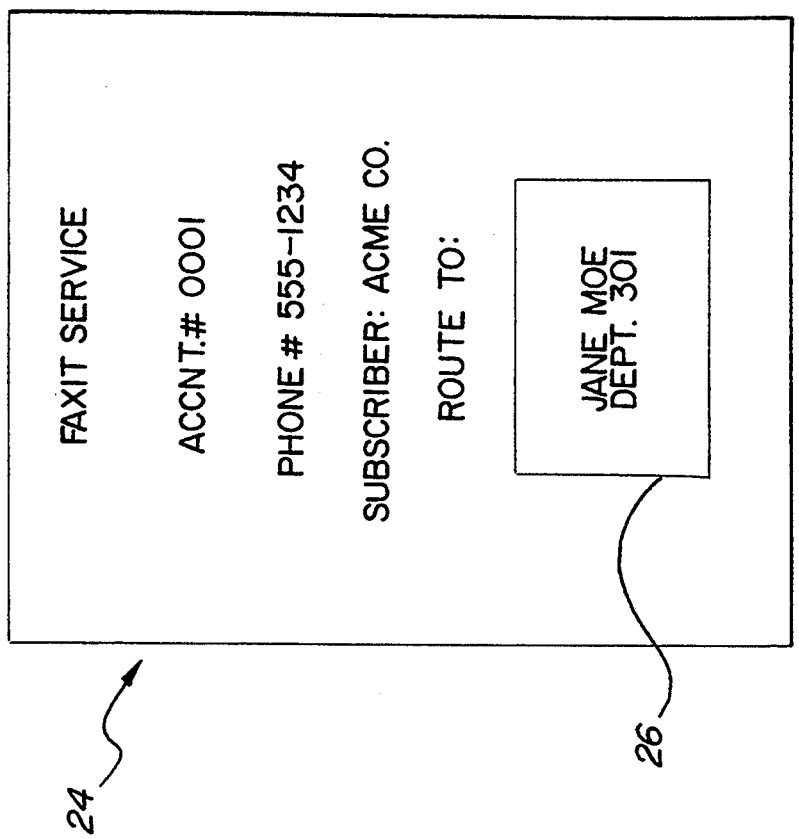
FIG. 3 illustrates an example of a personal identification form useful in the system of the present invention.

Throughout the following detailed description, like reference numerals will be used to describe the same element of the present invention shown in multiple figures thereof. Referring now to FIG. 1, there is schematically depicted a distributed facsimile information system 10 embodying the principles of the present invention. The information system 10 includes a central data base 12 which, in turn, includes a number of data files 13a, 13b, 13c, 13d. The system further includes a plurality of satellite data bases 14a, 14b, which each include at least one of data files 13a–13d. In the system schematically depicted, for example, satellite date base 14a includes data files 13a, 13b and satellite data base 14b includes data files 13c, 13d. The particular distribution of data files between the central data base and the plurality of satellite data bases is not considered to be significant in practicing the present invention, and it is possible that a satellite data base could include every data file present in the central data base or, in certain cases, even data files absent from the central data base. The important thing is that the various data files are distributed among the various data bases at various locations across the country to facilitate an expensive and efficient transmission of documents and other information.

The system 10 of the present invention further includes a central processing unit 16 which is in communication with both the central data base 12, and the satellite data bases 14a, 14b. Preferably, the central data base 12 will be situated at the same location as the central processing unit for ease of administration and operation. Thus, only one main facility need be provided the system of the present invention, and the satellite data bases can occupy low cost facilities at remote locations. Although described as a central processing unit, it is to be understood that the CPU 16 of the present invention includes all of the computing facilities needed to perform the operations of receiving, encoding, decoding, selecting, et cetera, required to operate the system of the present invention. Rather than combining all of these operations in one central computer, it may be more efficient to provide one or more dedicated computers for some specialized operations such as voice synthesis module 17, for example. All such arrangements are considered to be in the scope of the present invention.

Figure 2:
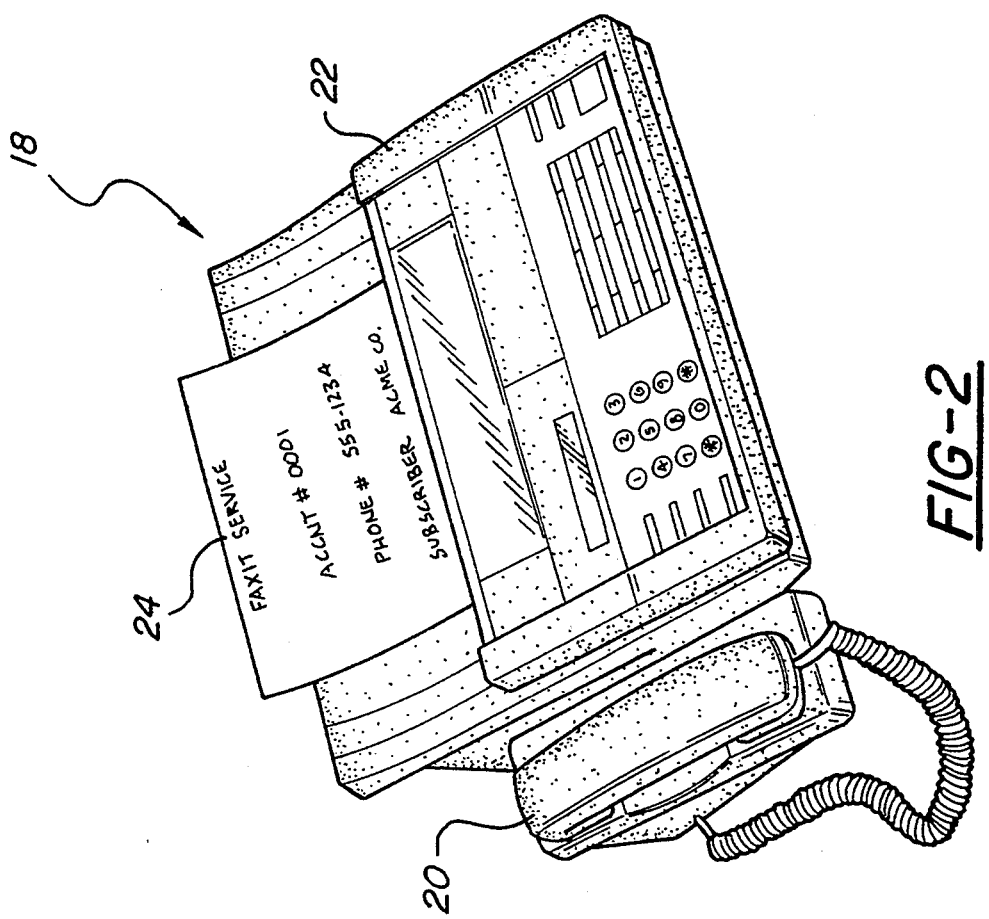
FIG. 2 is a representation of the subscriber terminal shown in block form in FIG. 1.

A plurality of subscriber terminals 18 are included in the system 10 of the present invention. Each subscriber to the information system will have at least one terminal 18, and may have a plurality of such terminals if the subscriber's needs are complex enough. As can be seen in FIG. 2, each subscriber terminal 18 includes at least a touch-tone telephone 20 and a facsimile machine 22 capable of sending both an outgoing facsimile transmission and receiving an incoming facsimile transmission. Both the telephone 20 and the facsimile machine 22 are connected to the switched network of communication lines maintained as part of the public telephone system. Obviously, there is a large range of equipment available in the marketplace suitable for functioning as the terminal 18 of the present invention, and the particular model of hardware will not be discussed in detail.

An individual requesting a document or other information (which individual may be the information subscriber, himself/herself, or in the case of an institutional subscriber, an individual member of the institution) may access the system 10 of the presentation invention via touch-tone telephone 20. After dialing the phone number of an information service implementing the system of the present invention, the individual user will, typically, be greeted by the beginning of a voice synthesizer program which will issue voice messages prompting the user to enter a subscriber account number, the establishment of which will be explained in greater detail below. After the individual has logged onto the system in this manner, the voice synthesizer program will then issue a series of commands prompting the individual to enter via the buttons of the touch-tone phone inputs reflecting a request for specific information or specific documents, in a manner known in the prior art. See, for example, U.S. Pat. No. 5,068,888 and U.S. Pat. No. 5,072,309.

In the case of an institutional subscriber, the system needs to be able to recognize the identity of the particular individual member requesting the information so that the retrieved document or information can be routed to the individual. Rather than assigning and requiring entry of an individual password, the system of the present invention accomplishes that end in the following manner. After the individual has logged onto the system as described above, the system generates an identity request form 24, an example of which is shown in FIG. 3. The form 24 includes such information as the name of the information service, the account number of the subscriber, the phone number of the subscriber, the subscriber's name, et cetera. Most significantly, the form 24 provides a block 26 for entry of the name of the individual requesting the information, and any other identifiers, such as department number, the individual believes would be helpful to proper routing. In the example shown, Jane Moe of the ACME Company is the individual requestor and ACME Company is the subscriber. Jane Moe is located in Department 301 of the ACME Company.

After Jane receives form 24 via her facsimile machine 22, she then enters her name and other identifiers in the block 26 and faxes the completed form back to the central processing unit 16. The central processing unit 16 is programmed to include form 24 with the information or document which it retrieves and transmit it back to Jane's facsimile machine. Even if Jane is absent when her documents are received, whoever is attending the facsimile machine 22 will know to route the documents to Jane since form 24 will be included with the document. Alternatively, the CPU 16 may store the graphic appearance of block 26 in memory in digital form and retransmit the stored data back to Jane's facsimile along with Jane's information. The identify information Jane wrote in block 26 will be graphically recreated by facsimile machine 22 on Jane's documents.

Let us assume that Jane is a patent attorney and she is requesting information contained in various U.S. issued patents. For example, Jane may wish to have the full text of all the claims from U.S. Pat. No. 5,000,000. She will format her request by means of the voice prompts as explained above. These inputs will be received by the central processing unit 16 which will then scan all of the data bases 12, 14a, 14b to determine which data bases contain the requested information. Let us also assume that the central data base 12 contains in digitally stored form the full text of all U.S. patents issued since 1980. The central data base is in Arlington, Va. Jane's office is in Sacramento, Calif. If the information she requests is not located in any of the satellite data bases 14a, 14b, then the claims will have to be transmitted over the public telephone network all the way from Arlington to Sacramento. If however, both satellite data bases include a data file containing the claims, but not the full text, of all U.S. patents issued after 1980 then the central processing unit will make that determination and will select the closest satellite data base to Jane as the transmitting data base. For example, if satellite date base 14a is in Chicago and satellite date base 14b is in Salt Lake City, the central processing unit 16 will select satellite date base 14b as the transmitting data base. Jane's information request will be transmitted only from Salt Lake City to Sacramento. Particularly in cases where the requested information or documents are extensive, the cost savings realized by distributing the data files among satellite data bases can be considerable.

In addition to transmitting Jane's information from the closest data base, the central processing unit 16 also has the capability of calculating a charge to the subscriber for providing the requested information. The CPU then generates digital information relating to an invoice reflecting the subscriber charge and transmits the digital information to the subscriber's facsimile which graphically constructs an invoice for the subscriber. Thus, there is no necessity for a separate billing department, and much inaccuracy is avoided. The system can even be programmed to keep a running total of charges for a particular subscriber and include these totals on the facsimile-generated invoice. Obviously, this aspect of the system considerably reduces personnel costs.

The above paragraphs describe how the present system can efficiently and promptly provide information and documents requested by a user, as well as generate an accurate invoice, in a totally automated manner without requiring any human operator. Moreover, this capability of the system extends even to the process of setting up an account for a new subscriber, a process which hithertofore has required the intervention of an actual human being. This capability is provided as part of the voice synthesis program contained in the central processing unit 16. After calling the information system on a touch-tone telephone, the caller receives a voice message querying whether this is a new subscriber or an existing subscriber. If the caller identifies himself/herself as a new subscriber, the voice synthesis program then goes into a subroutine which consists of a series of voice prompts requesting the caller to provide new subscriber identification data such as name, location, telephone number, facsimile number (if different), et cetera. After requesting verification for correctness of the entered data, the CPU then generates a new account number which is communicated verbally to the new subscriber over the phone by voice synthesis. However, rather than relying on the caller to remember or write down the account number, the central processing unit also transmits the account number to the new subscriber's facsimile machine for the new subscriber's records.

Thus, the system of the present invention is designed to operate in a most cost effective manner by minimizing both the cost of running the system since it is totally automated, and the cost of using the system since, by distributing the data bases, telecommunication charges are significantly reduced. Of course, there are other arrangements and designs of the elements of the present invention which may occur to one skilled in the art by using the teachings of the present invention without departing from the scope thereof. It is the claims of the present invention and all equivalents thereof, rather than the particular embodiments and exemplifications described herein, which define the scope of the present invention.

We claim:

1. A distributed facsimile information system for use with a plurality of input/output terminals disposed at remote locations of subscribers to said information system and each including a touch-tone phone for the entry of inputs corresponding to requests for particular information and a facsimile machine for the receipt of said particular information, said system comprising:

a central data base including a plurality of data files containing digitally stored information;

at least one satellite data base including at least one of said plurality of data files;

a central processing unit in communication with the central data base and the at least one satellite data base for retrieving data from said plurality of data files, said terminals being in communication with said central processing unit through a public telephone network; and said central processing unit being programmed to retrieve in response to a request for information from a subscriber said requested information from one of said central and said at least one satellite data base and to transmit said requested information to said subscriber's facsimile machine.

2. The system of claim 1 wherein said central processing unit is further programmed to calculate a charge to said subscriber for retrieving and transmitting said information, generate digital billing information relating to an invoice reflecting said charge, and transmit said invoice to said terminal via said facsimile.

3. The system of claim 1 wherein said central processing unit is further programmed to respond to said request for information from said subscriber by generating a form including at least a block for indicating the identity of a particular person requesting the information and transmitting said form to said subscriber's terminal so that said block may be filled in and transmitted to said central processing unit, and to store said block for retransmission back to said terminal along with said requested information so that the requested information may be easily routed to said particular person.

4. The system of claim 1 further comprising a voice synthesizer program adapted to establish an account number for a new subscriber and transmit a confirming facsimile including said account number for verification to the new subscriber's terminal.

5. The system of claim 4 wherein the voice synthesizer program is further programmed to lead a user through a menu of commands for entry of identification data concerning said new subscriber to establish said account number.

6. A distributed facsimile information system for use with a plurality of input/output terminals disposed at remote locations of subscribers to said information system and each including a touch-tone phone for the entry of inputs corresponding to requests for particular information and a facsimile machine for the receipt of said particular information, said system comprising:

a central data base including a plurality of data files containing digitally stored information;

a central processing unit in communication with the central data base for retrieving data from said plurality of data files, said terminals being in communication with said central processing unit through a public telephone network; and said central processing unit being programmed to retrieve in response to a request for information from a subscriber said requested information from said central data base and transmit said requested information to said subscriber's facsimile machine, and to calculate a charge to said subscriber for retrieving and transmitting said information, generate digital billing information relating to an invoice reflecting said charge, and transmit said invoice to said terminal via said facsimile.

7. The system of claim 6 wherein said system comprises a plurality of satellite data bases at various locations remote from said central data base, said central processing unit being further programmed to identify a closest data base to said subscriber's terminal that contains the requested information and cause said requested information to be transmitted from said chosen data base to said subscriber's terminal.

8. A distributed facsimile information system for use with a plurality of input/output terminals disposed at remote locations of subscribers to said information system and each including a touch-tone phone for the entry of inputs corresponding to requests for particular information and a facsimile machine for the receipt of said particular information, said system comprising:

a central data base including a plurality of data files containing digitally stored information;

a central processing unit in communication with the central data base for retrieving data from said plurality of data files, said terminals being in communication with said central processing unit through a public telephone network; and said central processing unit being programmed to retrieve in response to a request for information from a subscriber said requested information from said central data base and transmit said requested information to said subscriber's facsimile machine, and to respond to said request for information from said subscriber by generating a form including at least a blank for indicating the identity of a particular person requesting the information and transmitting said form to said subscriber's terminal so that said blank may be filled in and transmitted to said central processing unit, and to store said filled in blank for retransmission back to said terminal along with said requested information so that the requested information may be correctly routed to said particular person.

9. The system of claim 8 wherein said form containing said blank is retransmitted to said subscriber's terminal.

10. The system of claim 8 wherein said blank is digitally stored by said central processing unit.

11. A method of providing requested information via facsimile to a plurality of information subscribers, said method including the steps of:

providing a central data base which includes a plurality of data files containing digitally stored information;

providing a central processing unit in communication with the central data base for retrieving data from said plurality of data files;

providing a plurality of input/output terminals disposed at remote locations of said subscribers to said information system and each including a touch-tone phone for the entry of inputs corresponding to a request for particular information and a facsimile machine for the receipt of said particular information, said terminals being in communication with said central processing unit through the public telephone network; and programming said central processing unit to respond to a request for information from a subscriber by retrieving said requested information from said central data base, transmitting said requested information to said subscriber's facsimile machine, calculating a charge to said subscriber for said information, generating digital billing information relating to an invoice reflecting said charge, and transmitting said invoice to said terminal via said facsimile.

12. The method of claim 11 including the further step of programming said central processing unit to further respond to said request for information from said subscriber by generating a form including at least a block for indicating the identity of a particular person requesting the information and transmitting said form to said subscriber terminal so that said block may be filled in and transmitted to said central processing unit, to store said filled in block and to retransmit said stored block back to said subscriber's terminal along with said requested information so that the requested information may be easily routed to said particular person.

13. The method of claim 11 including the further step of establishing an account number for a new subscriber by means of a voice synthesizer program and transmitting a confirming facsimile including said account number for verification to said subscriber terminal.

14. The method of claim 13 comprising the further step of programming the voice synthesizer program to lead said new subscriber through a menu of commands for entry of identification data concerning said new subscriber to establish said account number.

15. The method of claim 11 comprising the further steps of providing a plurality of satellite data bases at various locations remote from said central data base and programming said central processing unit to identify a closest data base to said subscriber terminal that contains the requested information and transmit said requested information from said identified data base to said subscriber terminal.

16. A distributed facsimile information system comprising:
a central data base including a plurality of data files containing digitally stored information;
a plurality of satellite data bases, disposed at various locations remote from the central data base, each of said plurality of data bases including at least one of said plurality of data files;
a central processing unit in communication with the central data base and at least one satellite data base for retrieving data from said plurality of data files;
a plurality of input/output terminals disposed at remote locations of subscribers to said information system and each including a touch-tone phone for the entry of inputs corresponding to requests for particular information and a facsimile machine for the receipt of said particular information, said terminals being in communication with sad central processing unit through the public telephone network; and
sad central processing unit being programmed in response to a request for information from a subscriber to identify a closest data base to said subscriber's terminal that contains the requested information to retrieve said request information from said closest satellite data base and to cause aid requested information to be transmitted to said subscriber's facsimile machine from said closest data base.

* * * * *